(No Model.)
B. F. MANSFIELD.
LIFTING JACK.
No. 292,666. Patented Jan. 29, 1884.
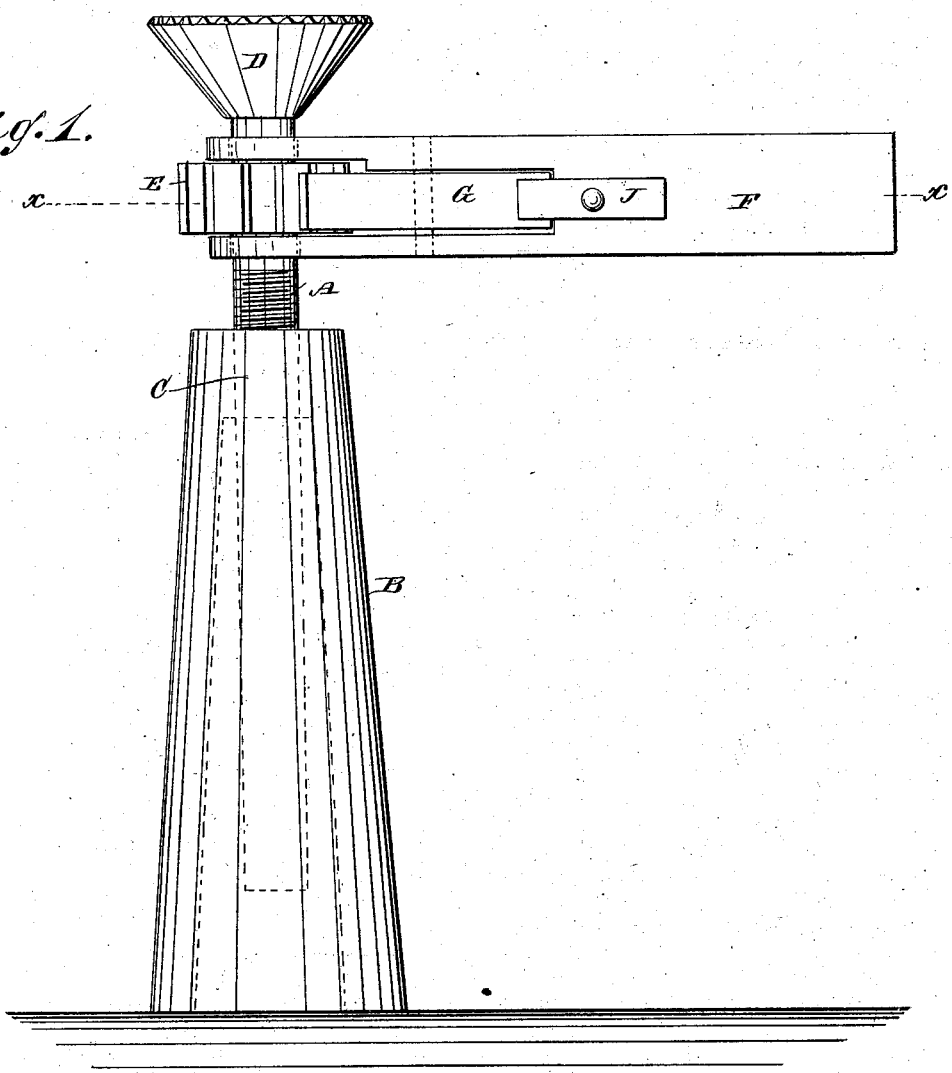
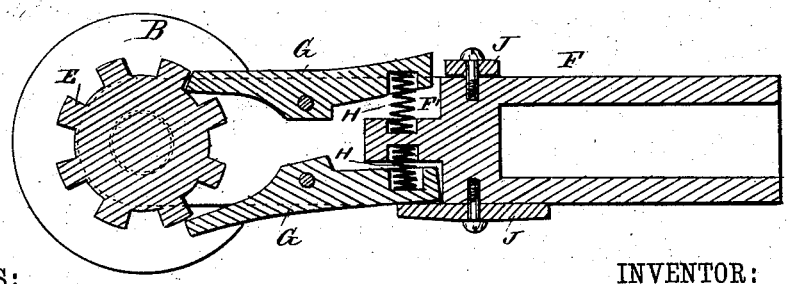
WITNESSES:
INVENTOR:
B. F. Mansfield
BY Munn & Co.
ATTORNEYS.

UNITED STATES PATENT OFFICE.

BENJAMIN F. MANSFIELD, OF CENTERVILLE, OREGON.

LIFTING-JACK.

SPECIFICATION forming part of Letters Patent No. 292,666, dated January 29, 1884.

Application filed October 12, 1883. (No model.)

*To all whom it may concern:*

Be it known that I, BENJAMIN F. MANSFIELD, of Centerville, in the county of Umatilla and State of Oregon, have invented a new and Improved Jack-Screw, of which the following is a full, clear, and exact description.

The object of my invention is to provide a new and improved jack-screw, which can be raised or lowered very easily and rapidly.

Reference is to be had to the accompanying drawings, forming a part of this specification, in which similar letters of reference indicate corresponding parts in both the figures.

Figure 1 is a longitudinal elevation of my improved jack-screw. Fig. 2 is a sectional plan view of the same on the line $x\,x$, Fig. 1.

The screw A is held in a hollow block or stock, B, having a screw-threaded aperture, C, in its top.

On the upper end of the screw-spindle A a head, D, is held loosely to turn, which head has its upper surface roughened or serrated to prevent it from slipping. A small toothed wheel, E, is rigidly mounted on the screw-spindle A below the head D, and is held between the shanks of the forked end of a lever, F, mounted to turn on the screw-spindle. Two pawls, G, are pivoted in the forked end of the lever F on opposite sides, the inner ends of which pawls are pressed outwardly by springs H, thereby pressing the outer ends of the pawls against and between the teeth of the wheel E. A latch, J, is pivoted at each side of the lever F at the base ends of the prongs of the forks. The lever F is provided with recesses F', for receiving the inner ends of the pawls G.

The operation is as follows: If the screw is to be raised, the inner end of one of the pawls G is pressed into the corresponding recess F', and the inner end of the said pawl is held in the recess by one of the latches J, as shown in the drawings. Only that pawl the inner end of which is free engages with the toothed wheel E, whereas the free end of the pawl which has its inner end locked in the recess does not engage with the wheel E. The free pawl engages with the wheel E while swinging the lever F in one direction, and slides over the teeth while swinging the lever in the inverse direction. If the screw-spindle is to be lowered, the positions of the pawls are reversed, and the pawl that is locked while raising the spindle is unlocked when the spindle is to be lowered.

If desired, the lever F can be round, and the pawls G can be locked in place by a sliding ring on the said lever.

I am aware that it is not new to use a double cam operated by a median spring or stud and cam-levers; but What I do claim as new and of my invention is—

The combination of the lever F, the two middle pivoted pawls, G G, the springs H H, and the opposite pivoted latches, J J, with a toothed wheel, E, on the screw-spindle, as shown and described.

BENJAMIN F. MANSFIELD.

Witnesses:
 THOS. BURNETT,
 H. B. ROBLEY.